United States Patent [19]

Schaible

[11] Patent Number: 4,579,052
[45] Date of Patent: Apr. 1, 1986

[54] LARGE BALE PRESS

[75] Inventor: Siegfried Schaible, Singen, Fed. Rep. of Germany

[73] Assignee: Klockner-Humboldt-Deutz AG Zweigniederlassung Fahr, Gottmadingen, Fed. Rep. of Germany

[21] Appl. No.: 674,971

[22] Filed: Nov. 26, 1984

Related U.S. Application Data

[63] Continuation of Ser. No. 470,256, Feb. 28, 1983, abandoned.

[30] Foreign Application Priority Data

Mar. 10, 1982 [DE] Fed. Rep. of Germany ....... 3208645

[51] Int. Cl.$^4$ .............................................. B65B 13/18
[52] U.S. Cl. ......................................... 100/5; 56/341; 100/19 R
[58] Field of Search ..................... 100/5, 17, 18, 19 R, 100/20, 21; 56/341, 342, 343

[56] References Cited

U.S. PATENT DOCUMENTS 4,282,803  8/1981  Cools ..................................... 100/5

FOREIGN PATENT DOCUMENTS 2620807 11/1977 Fed. Rep. of Germany .......... 100/5
2397144  3/1979 France .................................... 100/5

Primary Examiner—Billy J. Wilhite
Attorney, Agent, or Firm—Lyman R. Lyon

[57] ABSTRACT

A large bale press for cylindrical and/or rectangular bales of cut blade material comprises a compression chamber having an input opening for the blade material, a discharge opening for the finished bales, a take-up unit for the cut blade material, and a conveyer drum between the take-upunit and the input opening. One or more typing mechanisms each having a swivel yarn guide and swivel needle, effects wrapping of a corresponding number of yarn strands around the bale. The discharge opening is formed by pivoting part of the compression chamber about a horizontal axis.

1 Claim, 4 Drawing Figures

LARGE BALE PRESS

This is a continuation of co-pending application Ser. No. 470,256 filed on Feb. 28, 1983, now abandoned.

BACKGROUND OF THE INVENTION

The invention concerns a large bale press for cut blade material comprising a compression chamber that can be opened for discharge of the bale. The compression chamber has an input opening for feeding of the blade material from a take-up device and conveyer drum.

In view of a capability of baling several hectares of blade material per hour, which makes use of even brief periods of good weather possible, the use of large bale presses is on the increase. The majority of such presses are rolling bale presses. Rollers are arranged on the circumference of the compression changer to form the input blade material into a round bale. However, such bales are severely matted because the individual blades become intertwined with each other. Also, the compression chamber of the baler is driven by a mechanically complicated power train making such known rolling bale presses cumbersome and complicated in design. Moreover, such known bale presses are capable of producing only round bales, which are undesirable when stored on sloping areas.

Another type of large bale press comprise a compression chamber having a discharge opening that is activated by a hydraulic or mechanical system that is powered by the tractor. While conveyer elements on the circumference of the compression chamber and their driver mechanism are eliminated, a hydraulic or mechanical transmission is still required for the compression process.

The objective of this invention is a simple bale press that can be manufactured economically and is safe in operation.

SUMMARY OF THE INVENTION

A large bale press, in accordance with the present invention, comprises a compression chamber that is fed by a conveyer drum corresponding to the width of the bale to be formed. One or more tying mechanisms are provided, each with its own yarn supply roll, and arranged above an input opening to the compression chamber and the conveyer drum. Each tying mechanism is coordinated with a swivel needle and a moveable yarn guiding device.

The conveyer drum stuffs the blade material into the compression chamber, achieving high density. This eliminates the mechanical pressing process and the hydraulic or mechanical pressing components, thus eliminating complicated mechanism.

In a preferred example, the upper part of the compression chamber is slotted in the circumferential direction. The slots are a lead-through for the yarn guide components. At the beginning of the filling process, the yarn guide components guide the yarn strands in order for the yarn to wrap correctly around the bale. Instead of the usual spiral binding process, any desired number of yarn rings may be wrapped around the bale and tied in knots, which results in a fast tying process.

Preferably, the yarn guide components are connected with an openable rear wall portion of the compression chamber in a way that they are operated by the swivel movement thereof. The yarn guide components are swiveled toward the tying mechanism when the rear wall of the chamber is opened. When the rear wall of the chamber is being closed, the yarn guide components seize the yarn strands and swivel back into their original position.

Another feature of the present invention is that the compression chamber is tiltably arranged around a horizontal axis that is transverse to the driving direction. This tilting of the entire compression chamber through a relatively small angle makes problem-free delivery of the needle to the typing apparatus possible in order to knot the yarn arranged around the completed bale.

The compression chamber itself can be round or rectangular. A rectangular shape for the bale has the advantage that it is easier to transport and increasees the available cube of the compression chamber approximately 20%. A rectangular shape is of special advantage for silo storage, since such bales are easy to stack.

The conveyer drum can be equipped with a cutting mechanism for cutting the blade material, which makes the large bale press suitable for any kind of feed. Compared to the spiral binding method, there is little "dead time" of the equipment when tying the bales.

DESCRIPTION OF THE PREFERRED EMBODIMENT

Figure 1:
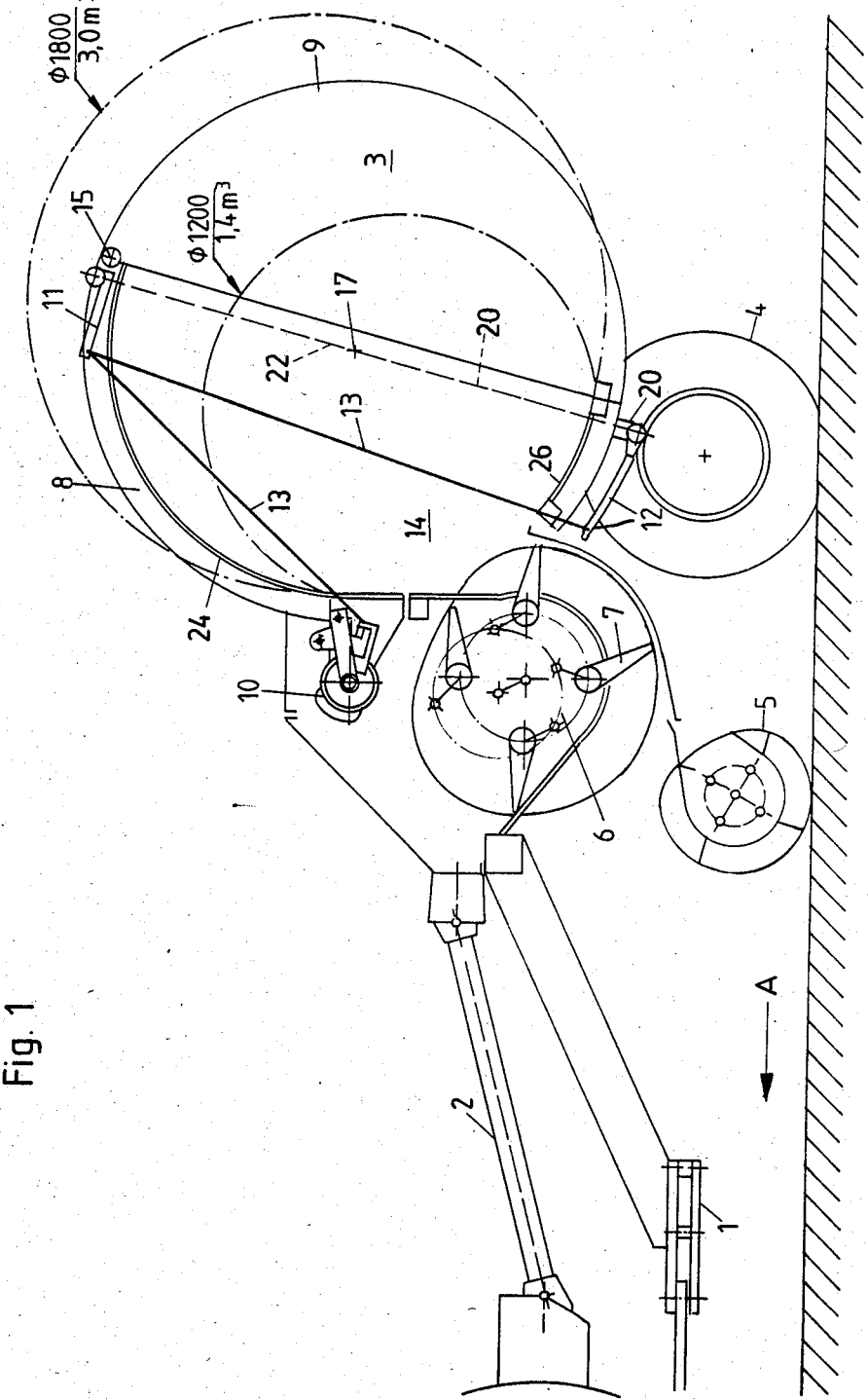
FIG. 1 A schematic side view of a large bale press according to the invention, with a cylindrical compression chamber prior to the start of the filling process.

As seen in FIG. 1 of the drawings, a large bale press comprises a trailer coupling which is attachable to a tractor (not shown). A Cardan shaft 2 transmits power from the tractor to the large bale press. A compression chamber 3 is supported on drive wheels 4 for movement in the direction of the arrow A. A take-up unit 5 takes up the cut blade material and channels it into a conveyer drum 6. The conveyer drum is equipped with forwarding prongs 7, and can have an additional cutting unit (not shown), which works together with the prongs to cut the long blade material in order to achieve denser packing in the compression chamber 3.

The compression chamber 3 consists of two housing halves, 8 and 9. The housing half 8 is fixed, and the second half, 9, can be tilted up around a swivel axis 15 to permit the finished bale to be discharged from the compression chamber 3. A conventional tying mechanism 10 comprises a yarn supply roll from which the yarn 13 runs over a swivel yarn guide 11 to a swivel needle 12. The swivel needle 12 is mounted on an arm 20 and the yarn guide 11 is mounted on an arm 22. By comparing FIGS. 1, 3 and 4, it can be seen that the arms 20 and 22 (shown partially diagramatically) pivot about an axis 17 to carry the needle 12 and guide 11, respectively, into operative relationship to the tying mechanism 10.

As seen in FIG. 1, the compression chamber 3 is of circular cross section and has an input opening 14 to provide for admission of blade material into the compression chamber 3. The compression chamber can easily be taken off so that different sizes can be used;

e.g., a bale with a diameter of approximately 1.2 meters and a volume of 1.4 cubic meters can be formed, or one with a diameter of 1.5 meters and a volume of 2.1 cubic meters, or one with a diameter of 1.8 meters and a volume.

Figure 2:
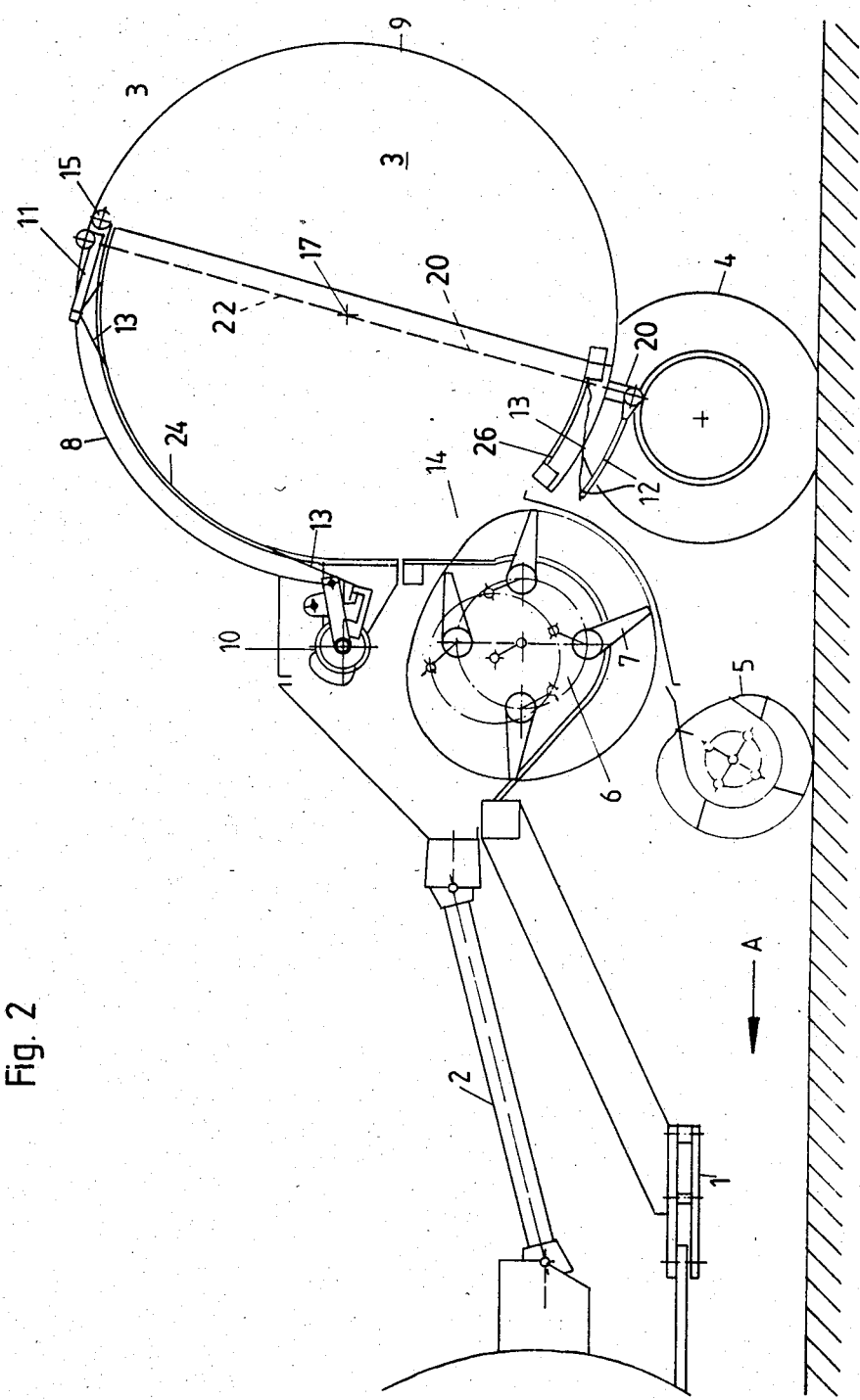
FIG. 2 The same large bale press after filling of the compression chamber.

FIG. 1 shows the large bale press in condition to pick up blade material. The yarn 13 of each typing apparatus, any desired number of which can be arranged side by side, runs over yarn guide 11 to swivel needle 12 and is attached thereto. If the large bale press is set into motion, compression chamber 3 slowly fills with cut blade material, while the yarn 13 wraps around the bale through feeding pressure so as to enclose the rear half of the bale, as shown in FIG. 2.

The conveyer drum 6 is preferably the length of the compression chamber 3 and bale 16, and is situated between the take-up unit 5 and the input opening 14 of the chamber 3. The drum 6 stuffs the feed into compression chamber 3, achieving very high density. A cutting mechanism may be integrated with the drum 6 if high density is desired.

Figure 3:
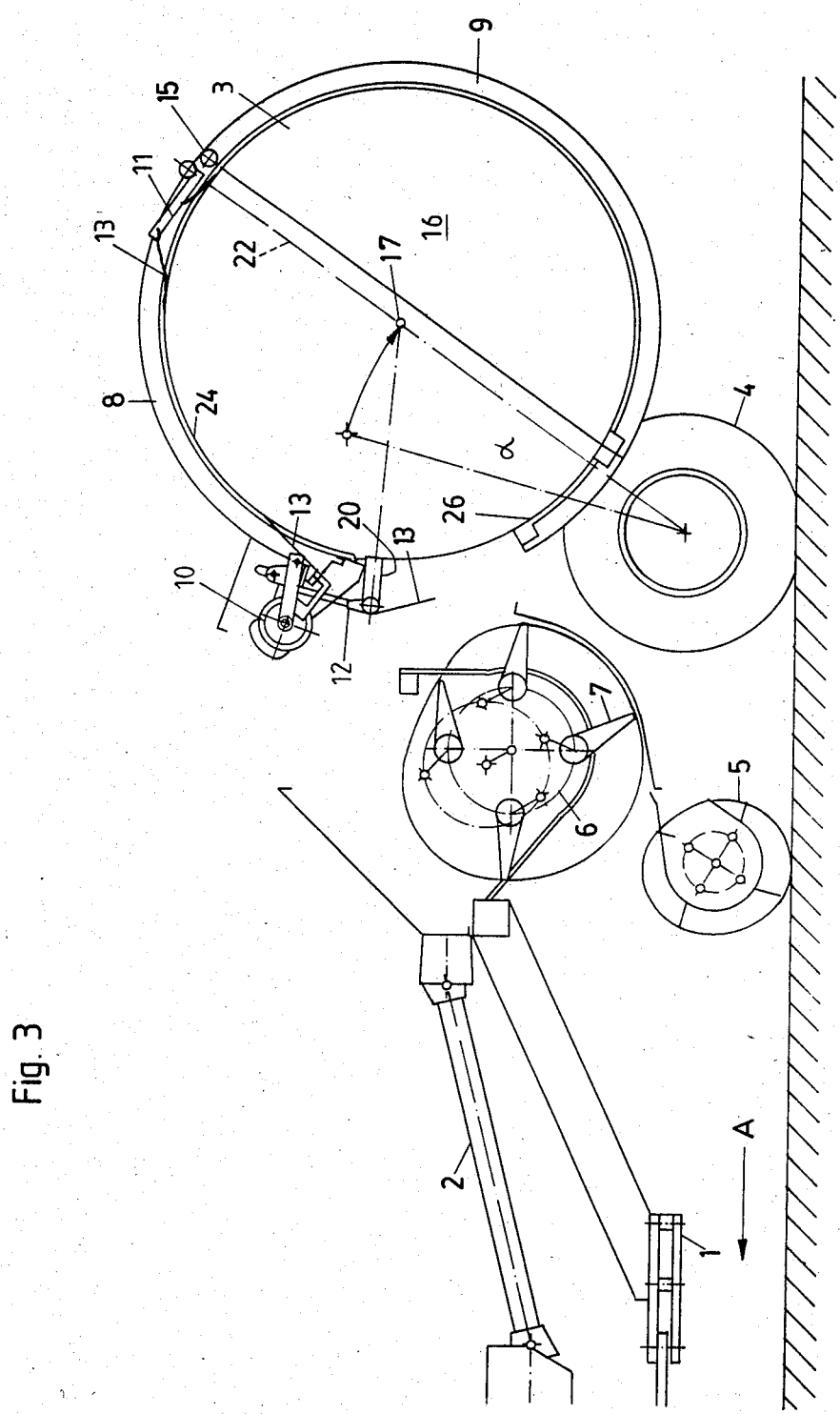
FIG. 3 The large bale press in the position in which the knot is made.

After compression chamber 3 is filled with feed and the yarn 13 has wrapped around the rear half of the bale, compression chamber 3 is tilted backward by an angle α, as shown in FIG. 3. Simultaneously, the needle 12 is moved toward its corresponding tying apparatus 10, which automatically forms a knot and separates the yarn from the supply roll. Thus, the bale is wrapped by one or more parallel yarn circles, depending on the number of tying apparatus and corresponding number of needles, and can now be ejected, as shown in FIG. 4.

To achieve bale discharge, the rear portion 9 of the compression chamber 3 swivels around swivel axis 15 with respect to the fixed portion 8 thereof, and, thus, forms a discharge opening which is large enough to permit the finished bale 16 roll off to the rear.

When the rear portion 9 of compression chamber 3 is opened, yarn guide 11 is swiveled into close proximate relation to the tying apparatus 10 and seizes the yarn 13. When rear portion 9 of chamber 3 is closed after ejection of the finished bale 16, yarn guide 11 swivels back into its original position, as well as needle 12 that also has seized yarn 13, and is returned to its initial position.

Figure 4:
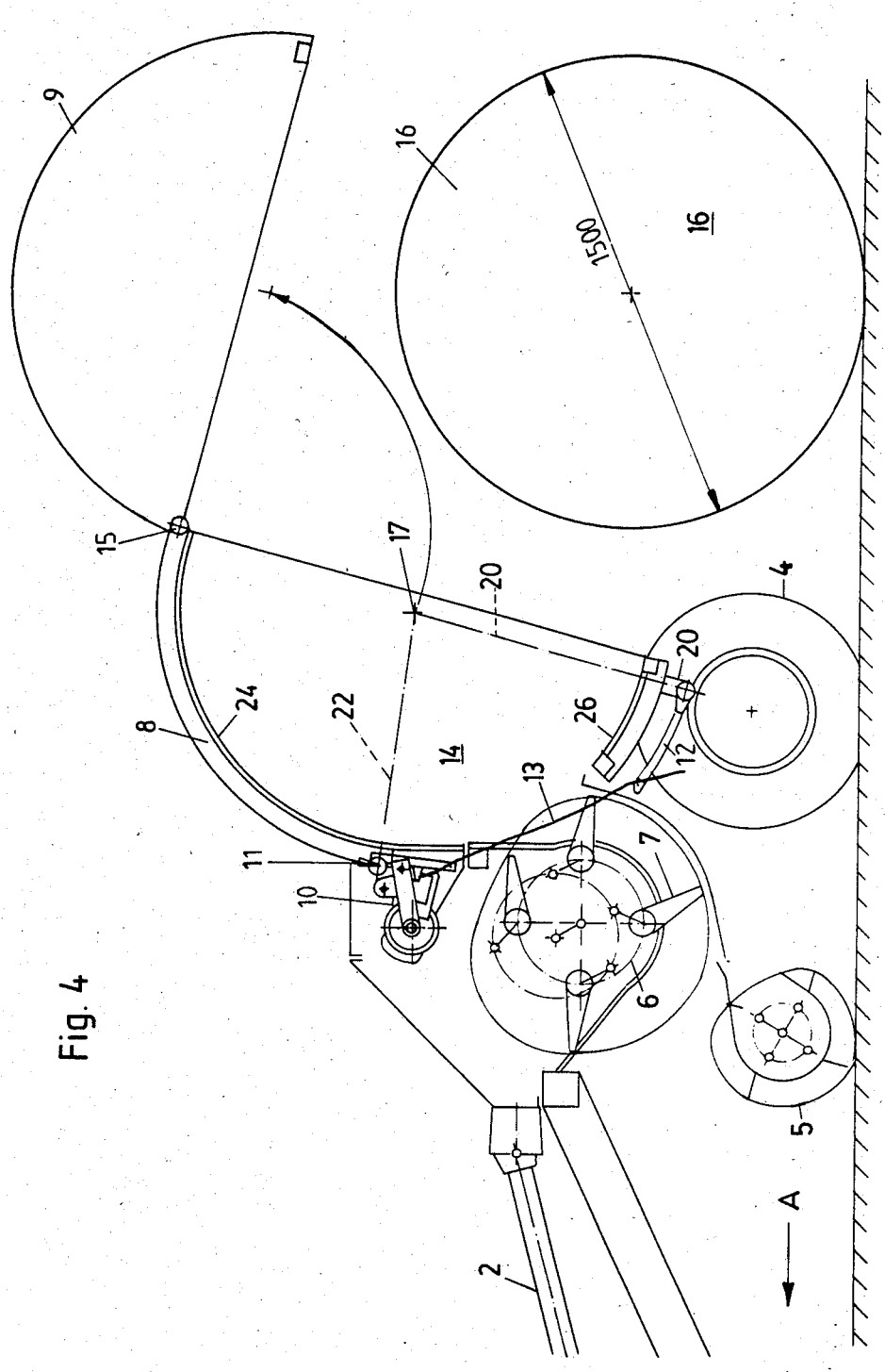
FIG. 4 The same large bale press during ejection of the finished bale.

As seen in FIGS. 1 and 4, the front portion 8 of the compression chamber 3 is provided with slots 24 at the points at which one or more yarn guides 11 and needles 12 are arranged, so that the yarn can penetrate freely through the interior of compression chamber 3.

I claim:

1. A bale press for cut blade materials comprising
   a take-up unit for the cut blade material,
   a compression chamber having an input opening for the acceptance of cut blade material and a movable wall portion rotatable about a horizontal axis relative to said input opening for defining an outlet opening to facilitate discharge of a finished bale,
   a conveyor drum disposed between said take-up unit and the input opening in said compression chamber, said conveyor drum being rotatable about an axis extending at a right angle to the flow of cut blade material from said takeup unit to said conveyor drum then through the input opening in said compression chamber,
   a yarn tying mechanism disposed above the input opening in said compression chamber,
   a yarn supply roll disposed above the input opening in said compression chamber,
   a length of yarn having one end portion supported by said supply roll,
   a yarn guide disposed above said chamber inlet opening in a normal position spaced from said yarn supply roll for controlling the position of an intermediate portion of said yarn,
   a swivel needle normally positioned below said chamber inlet opening for controlling the position of a free end portion of said yarn,
   said yarn extending from said supply roll to said yarn guide thence to said needle so as to envelope said blade material upon passage thereof through the inlet opening in said compression chamber,
   said swivel needle being rotatable in a first direction about an axis extending parallel to the axis of rotation of said conveyor drum to carry the free end of said yarn to said tying mechanism,
   said swivel needle being rotatable in a second direction opposite to said first direction to carry the free end of said yarn to said normal position below the input opening in said compression chamber,
   said yarn guide being rotatable in one direction about an axis extending parallel to the axis of rotation of said swivel needle into close proximate relation to said yarn supply roll to pick up the intermediate portion of said yarn,
   said yarn guide being rotatable in the opposite direction to said one direction to said normal position to condition said bale press for the acceptance of cut blade material.

* * * * *